United States Patent [19]

Morimoto

[11] Patent Number: 5,545,861
[45] Date of Patent: Aug. 13, 1996

[54] MEMBRANOUS-VIBRATION SOUND ABSORBING MATERIALS

[75] Inventor: Toru Morimoto, 3-58-2, Wakamiya, Ichikawa-shi, Chiba, Japan

[73] Assignees: Toru Morimoto, Chiba; Unix Corporation, Ltd., Tokyo, both of Japan

[21] Appl. No.: 268,671

[22] Filed: Jun. 30, 1994

Related U.S. Application Data

[63] Continuation of Ser. No. 28,979, Mar. 10, 1993, abandoned.

[30] Foreign Application Priority Data

Mar. 13, 1992 [JP] Japan .................................. 4-055135

[51] Int. Cl.$^6$ ....................................................... E04B 1/82
[52] U.S. Cl. ........................... 181/290; 181/293; 181/294
[58] Field of Search ................................... 181/207, 208, 181/286, 288, 289, 290, 291, 293, 294; 428/596, 597, 608

[56] References Cited

U.S. PATENT DOCUMENTS

| | | | |
|---|---|---|---|
| 3,021,915 | 2/1962 | Kemp | 181/292 |
| 3,077,947 | 2/1963 | Peebles et al. | 181/290 |
| 3,620,906 | 11/1971 | Hannes | 181/290 |
| 4,040,213 | 8/1977 | Capaul | 181/290 |
| 4,128,683 | 12/1978 | Nomura et al. | 181/290 X |
| 4,263,356 | 4/1981 | Nomura et al. | 181/290 X |
| 4,559,255 | 12/1985 | Shimode et al. | 181/293 X |
| 4,709,781 | 12/1987 | Scherzer | 181/290 |
| 4,749,623 | 6/1988 | Endo et al. | 428/551 |
| 4,828,932 | 5/1989 | Morimoto et al. | 181/294 X |
| 5,084,357 | 1/1992 | Imai et al. | 428/461 |
| 5,192,624 | 3/1993 | Morimoto | 181/290 X |

FOREIGN PATENT DOCUMENTS

| | | |
|---|---|---|
| 0013513 | 7/1980 | European Pat. Off. |
| 0453941 | 10/1991 | European Pat. Off. |

*Primary Examiner*—Khanh Dang
*Attorney, Agent, or Firm*—Weiser & Associates

[57] ABSTRACT

The present invention provides a membranous-vibration sound absorbing material which can achieve not only good sound absorbing characteristics, workability and strength but also transparency. The membranous-vibration sound absorbing material can also achieve dust-proof and dust-free properties when necessary and can be suitably used for application in clean rooms and the like.

14 Claims, 7 Drawing Sheets

FIG. 1a

PRIOR ART

FIG. 1b

PRIOR ART

MEMBRANOUS-VIBRATION SOUND ABSORBING MATERIALS

This application is a continuation of application Ser. No. 08/028,979 filed Mar. 10, 1993, now abandoned.

BACKGROUND OF THE INVENTION

1. Technical Field

The present invention relates to membranous-vibration sound absorbing materials which feature excellent sound-absorbing characteristics, lightweight and excellent workability, as well as transparency so that people can see therethrough if necessary, and dust-proof and dust-free properties, and processes for producing the same.

2. Background Art

A host of sound absorbing materials are used to control noise in various locations such as airports, expressways and their surroundings, music halls, gymnasiums, construction sites, tunnels and clean rooms.

The sound absorbing materials are all made of porous materials which includes soft porous materials such as glass fiber, rock wool and sponge, porous molded boards such as porous sintered boards, metal fiber boards and foamed metal boards. Therefore, there is the general concept that sound absorbing materials are porous materials.

These sound absorbing materials have their own merits and demerits in terms of sound-absorbing characteristics, weatherability, cost and fabrication method and suitable types are used in accordance with the specific use of interest.

In recent years, the sound absorbing materials have been used for various applications and various demands are made for characteristics other than sound-absorbing characteristics.

One of the characteristics is that the other side can be seen through the sound absorbing material at a location where the sound absorbing material is installed, that is, transparency.

For instance, a sound-proof wall made of a sound absorbing material is installed as a side wall on both sides of a road to prevent noise pollution to residents along the road.

Polycarbonate has been used in insulation walls on expressways because of its good sound insulating property, but it has the demerit that the level of internal reflected sound is high. Moreover, such a conventional sound-proof wall perfectly shuts out the view of scenery outside the road so that passengers cannot see outside scenery and brings a sense of oppression to drivers. Therefore, the advent of a sound absorbing material having sound-absorbing characteristics as well as transparency is desired.

Noises at factories and research facilities include ones generated from various types of machine tools, measuring instruments, pumps, boilers, power generators and the like.

These noise sources are operated under a condition surrounded by sound absorbing materials made of porous materials such as glass fiber if necessary. Since the conventional sound absorbing materials do not have transparency, it is impossible to check the operation condition of machines through the sound absorbing materials. Therefore, the advent of a sound absorbing material having transparency is also desired in these places.

Meanwhile, it is necessary to perfectly prevent generation and entry of dust in clean rooms and the like. However, the conventional sound absorbing materials are not suitable for use in clean rooms because they are made of porous materials.

The present invention is intended to solve the above mentioned problems of the prior art, and therefore, the principal object of the present invention is to provide membranous-vibration sound absorbing materials which ensures not only excellent sound absorbing characteristics, workability and strength but also transparency that people can see therethrough and dust-proof and dust-free properties if necessary, and which can be used suitably for such applications as clean rooms, as well as a process for producing the same.

In order to attain the aforementioned object, the present inventors conducted intensive studies and accomplished the present invention on the basis of the following observations.

As already mentioned, most of the commercial sound absorbing materials used today are made of soft porous materials such as glass fiber and rock wool; porous molded boards such as porous sintered boards, metal fiber boards and metal foamed boards; and perforated plates such as perforated metal sheets.

As a result of studies on these sound absorbing materials, the inventors found it difficult to ensure transparency for these sound absorbing materials.

Meanwhile, it is known that sound is slightly absorbed by the membranous vibrations of a thin film such as a vinyl sheet, that is, causing vibrations in a smooth plane.

However, the sound absorbing effect achieved by utilizing the vibration of a smooth plane is very low and the maximum attainable absorption coefficient has been on the order of 0.3–0.5, which is too low to realize the commercial application of this concept.

As a result of the intensive studies on sound absorption by the membranous vibrations of a thin film, the inventors made the following discovery.

Figure 1A:
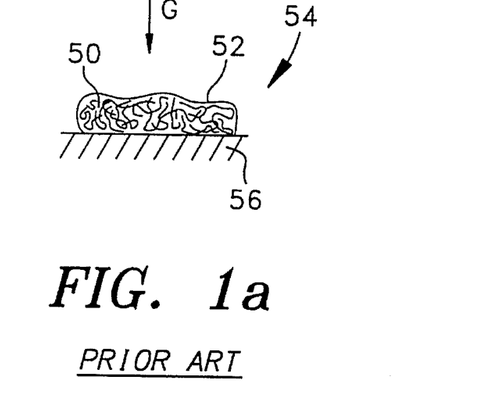
FIG. 1(a) and FIG. 1(b) are schematic diagrams for explaining the influence of the thin film used in the sound absorbing material on sound absorbing characteristics.
Figure 1B:
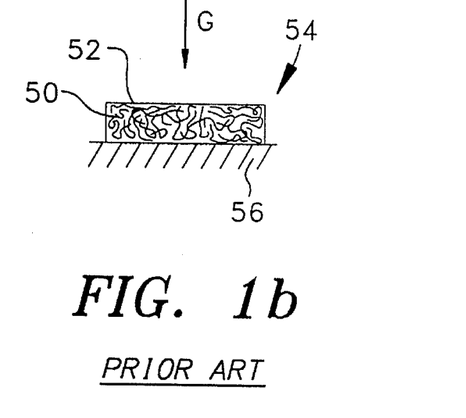

As one of sound absorbing materials used conventionally, widely known is a sound absorbing material 54 made of glass fiber 50 whose surface is covered with a thin film 52 such as a vinyl sheet as a surface protective material as shown in FIG. 1(a) and FIG. 1(b). Such a sound absorbing material 54 is generally combined with a sound insulating material 56 (a rigid body), but its sound absorbing characteristics vary depending on the state of the thin film 52.

In a state shown in FIG. 1(a), that is, a state that the thin film 52 is loosely stretched, the characteristics of the sound absorbing material 54 are mainly determined by the density, thickness and the like of the glass fiber 50. In addition to these, the thickness, rigidity and the like of the thin film 52 are controlled to achieve a sound absorbing material which exhibits excellent sound absorbing characteristics over a broad frequency range.

However, if the area of the thin film 52 is small, as shown in FIG. 1(b), the characteristics of the sound absorbing material 54 are determined by the tensile strength, thickness and the like of the thin film 52 irrespective of the density and thickness of the glass fiber 50 when the sound absorbing material 54 is constructed by covering the glass fiber 50 with the thin film 52 having tension.

In other words, under a condition that the thin film has flexibility like the sound absorbing material shown in FIG. 1(a), when sound waves G hit the thin film 52, the absorption coefficient is determined by the characteristics of the glass fiber 50 in most cases.

Contrary to this, under a condition that the thin film 52 has tension as shown in FIG. 1(b), most of the sound waves G are reflected by the thin film 52, and sound absorbing characteristics are almost determined by the thin film 52.

Here, the sound absorbing characteristics of the thin film 52 are determined by a resonance frequency f.

The resonance frequency f is represented by the following formula:

$$f=[C^2(\rho m/E)^{1/2}]/1.8t$$

where C represents acoustic velocity, ρm the volume density of the thin film 52, t the thickness of the thin film 52 and E the Young's modulus of the thin film 52.

As being obvious from the above formula, when the volume density ρm is constant, the resonance frequency f is greatly affected by the Young's modulus of the thin film 52, that is, the tension and thickness t of the thin film 52.

In this instance, such a thin film does not keep its own shape. For this reason, in order to make the thin film usable as a sound absorbing material, it is necessary to hold the thin film 52 with some holding member while the thin film keeps appropriate tension as described in the foregoing.

As a result of studies on a method to hold the thin film suitably under a condition that appropriate tension and transparency are ensured, the present inventors found that a thin film having a continuous plane or a plurality of ruptures is sandwiched between sheets having a large number of openings such as expanded metal sheets, perforated metal sheets and metal screens to hold the thin film ensuring its tension and transparency, and that the sound absorbing effect of the aforementioned membranous vibrations is combined with the sound absorbing effect of the sheets to achieve extremely excellent performance in sound absorbing characteristics. The inventors thus accomplished the present invention based on this discovery.

In other words, according to the first aspect of the present invention, there is provided a membranous-vibration sound absorbing material in which a resin thin film is held between sheets having a large number of openings.

According to the second aspect of the present invention, there is provided a membranous-vibration sound absorbing material including a porous material and a laminate in which a resin thin film is held between sheets having a large number of openings.

In the above-mentioned membranous-vibration sound absorbing material of the present invention, the sheets sandwiching the resin thin film preferably have openings of different sizes.

In the above-mentioned membranous-vibration sound absorbing material of the present invention, the sheets are preferably ones selected from expanded metal sheets, perforated metal sheets and metal screens.

In the above-mentioned membranous-vibration sound absorbing material of the present invention, the sheets are preferably made of aluminum and/or iron.

When the above-mentioned membranous-vibration sound absorbing material of the present invention is used as an insulation wall on expressways and the like, the resin thin film is preferably transparent.

Moreover, when the above-mentioned membranous-vibration sound absorbing material of the present invention is used as a sound-proof wall in clean rooms and the like, the resin thin film preferably has a continuous plane.

Furthermore, when the above-mentioned membranous-vibration sound absorbing material of the present invention is used as a sound-proof wall in locations other than clean rooms, the resin thin film preferably has ruptures.

These membranous-vibration sound absorbing materials of the present invention can be adapted to various modes according to application purpose.

For instance, the sound absorbing material which uses a resin thin film having a continuous plane entirely and no ruptures at all to ensure not only sound absorbing characteristics but also extremely excellent dust-proof and dust-free performances can be used for such application as clean rooms.

Moreover, it is possible to achieve better sound absorbing characteristics by attaching a porous material to the rear side of the sound absorbing material (a side of the sound absorbing material opposite to sound sources) while dust-proof and dust-free performances for clean rooms are maintained.

Meanwhile, since good transparency is ensured by using a transparent resin thin film, the sound absorbing material of the present invention can be used suitably for such applications requiring transparency as a noise controlling absorbent for machines in factories and an insulation wall on airports and expressways.

In addition, better sound absorbing characteristics can be attained by making ruptures in the resin thin film to create membranous vibrations. Therefore, the sound absorbing material of the present invention can achieve extremely excellent performance in sound absorbing characteristics under a condition that transparency is ensured. As a result, the sound absorbing material can be suitably used especially for applications requiring both transparency and excellent sound absorbing characteristics such as expressways and factories as described above. In this case, the sound absorbing material may be used in combination with a transparent sound insulating material.

DETAILED DESCRIPTION OF THE INVENTION

The sound absorbing materials of the present invention are described in detail hereinunder.

Figure 2A:
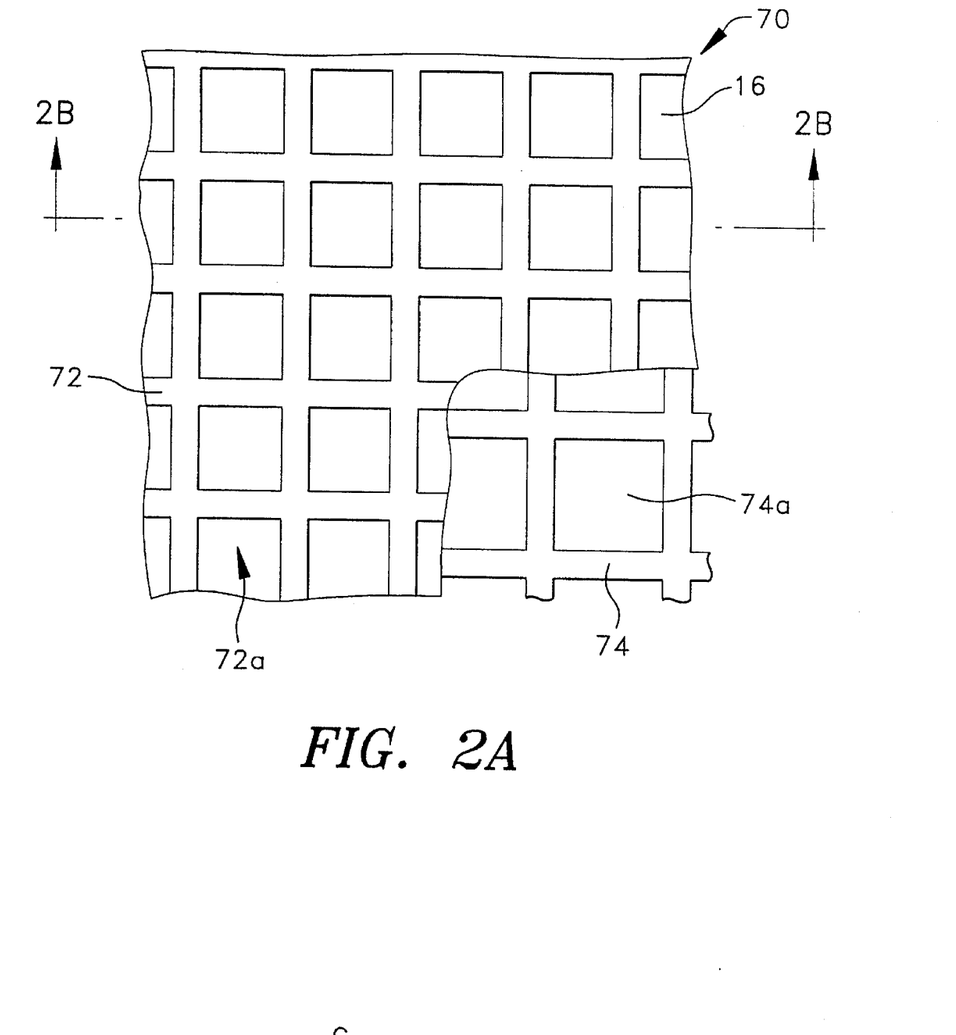
FIG. 2(a) is a schematic plan view showing an example of the membranous-vibration sound absorbing material of the present invention and 2(b) is a sectional view taken on line b—b.
Figure 2B:
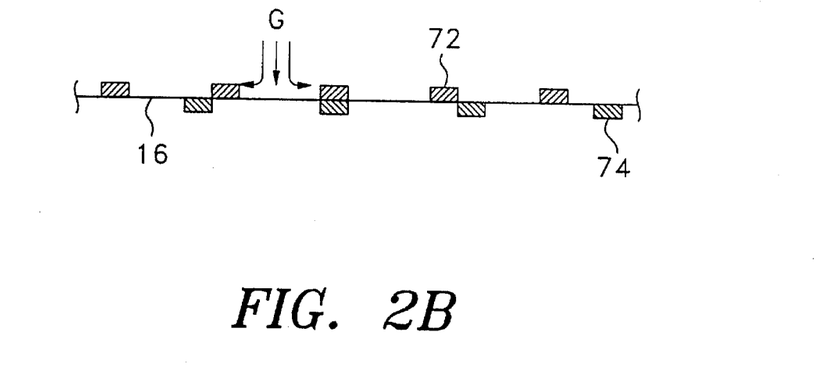

FIG. 2 is a schematic diagram showing an example of membranous-vibration of the present invention. FIG. 2(a) is a partially cutaway plan view of an example of the membranous-vibration sound absorbing material of the present invention and FIG. 2 (b) is a sectional view taken on line b—b.

The membranous-vibration sound absorbing material 70 (referred to as "sound absorbing material" hereinafter) shown in FIG. 2 is an example which uses a so-called perforated metal sheet which is prepared by forming a large number of openings in a metal sheet as a sheet having a large number of openings. The sound absorbing material has such a structure that a resin thin film 16 is held between two perforated metal sheets different in opening size: a perforated metal sheet 72 having smaller openings 72a and a perforated metal sheet 74 having larger openings 74a.

Since the sound absorbing material of the present invention has the structure described above, that is, the resin thin film having a continuous plane or a plurality of ruptures is held between sheets having a large number of openings and keeping its own shape such as perforated metal sheets and expanded metal sheets, preferably sheets different in opening size, the membranous vibrations of the resin thin film is combined with the sound absorbing effect of the sheets having a large number of openings to exhibit extremely high performance in sound absorbing characteristics. In addition, the sound absorbing material illustrated in the figure exhibits extremely high performance in sound absorbing characteristics with a simple structure that the resin thin film 16 is sandwiched between two perforated metal sheets 72 and 74.

The sound absorbing effect of the sound absorbing material of the present invention will be described with reference to FIG. 2.

As described in the foregoing, the resin thin film 16 having appropriate looseness without tension vibrates with sound waves that it receives to exhibit good sound absorbing characteristics.

In this instance, in order to achieve good sound absorbing characteristics by utilizing the membranous vibrations of the resin thin film 16, the resin thin film 16 needs to be in a state that it can vibrate satisfactorily with sound waves. For this purpose, a certain non-fixed area of the film is required. Meanwhile, the resin thin film 16 which can achieve good sound absorbing characteristics and will be described hereinafter has a thickness of ca. 4–50 µm and has an area required for absorbing sound. The resin thin film 16 which exhibits good sound absorbing characteristics has a problem in strength. Furthermore, the resin thin film itself does not keep its own shape.

Contrary to this, since the sound absorbing material 70 of the present invention is structured such that a resin thin film is held between sheets (preferably different in opening size), that is, perforated metal sheets 72 and 74 in the example illustrated in the figure, the vibrations of the resin thin film 16 are not disturbed and the resin thin film 16 is prevented from being damaged.

In other words, only one side of the resin thin film 16 is pressed by the perforated metal sheet 74 at an opening portion of the perforated metal sheet 72, and hence the resin thin film 16 at this portion can freely vibrate with sound waves. Meanwhile, as the other side of the resin thin film 16, even if it can vibrate, is pressed by the perforated metal sheet 72 having smaller openings, the resin thin film is protected by the other perforated metal sheet 74 and is not broken even when external force is applied.

Such membranous vibrations and the sound absorbing effect of the sheets having a large number of openings will be described in detail hereinunder. As shown in FIG. 2(b), when sound waves G are incident upon the resin thin film 16 held between the perforated metal sheet 72 and the perforated metal sheet 74, the resin thin film 16 vibrates by the compression effect of the sound waves (vibrating air) applied to the surface of the resin thin film 16 to exhibit a sound absorbing effect (referred to as "sound absorbing effect a" hereinafter).

Since the sound waves G incident upon the resin thin film 16 flows along the surface of the resin thin film 16, a sound absorbing effect (referred to as "sound absorbing effect b" hereinafter) is exhibited by the viscosity function of the flow of the sound waves G.

Furthermore, like "sound absorbing effect a" described above, when the resin thin film 16 vibrates, the resin thin film 16 touches the perforated metal sheets 72 and 74 sandwiching the film and absorbs the energy of both vibration and sound to exhibit a sound absorbing effect (referred to as "sound absorbing effect c" hereinafter).

The sound absorbing materials of the present invention can exhibit extremely high performance in sound absorbing characteristics due to the combination of the above-mentioned sound absorbing effects a, b and c when the resin thin film 16 has a continuous plane without ruptures.

In this instance, when the resin thin film 16 doesn't have a continuous plane but a plurality of ruptures such as slots formed in a regular or irregular pattern, the influence of the above-mentioned absorbing effects b and c is almost annulled, and instead, a sound absorbing effect is exhibited by the membranous vibrations of the ruptured portions (referred to as "sound absorbing effect d" hereinafter) and combined with the aforementioned sound absorbing effect a into a so-called Helmholtz resonance structure to exhibit extremely high performance in sound absorbing characteristics.

When the sound absorbing material of the present invention has ruptured portions in the resin thin film 16, the sound absorbing characteristics of the material are mostly affected by sound absorbing effects a and d. Therefore, the resin thin film 16 does not need to be combined with sheets such as perforated metal sheets and may be combined with soft porous materials such as glass fiber, rock wool and the like to achieve good sound absorbing characteristics.

In the sound absorbing material of the present invention, the sheets are not limited to perforated metal sheets illustrated in the figures, but various types of sheets which have a large number of openings and can keep their own shapes such as metal screens, expanded metal sheets, resin nets and perforated plates can be used and there is no particular limitation. The resin thin film may be sandwiched between different materials, for example, a perforated metal sheet and an expanded metal sheet, and a perforated metal sheet and a metal screen.

A description below is given of an example of the sound absorbing material which uses the perforated metal sheets 72 and 74 as a sheet for convenience' sake, but is basically the same for sound absorbing materials which use metal screens and expanded metal sheets if no particular description is given.

In the sound absorbing material 70 of the present invention, there is no particular limitation on the opening rate of the perforated metal sheets 72 and 74, but it can advantageously selected from the range of ca. 30–80% to achieve good sound absorbing characteristics.

Furthermore, there is no particular limitation on the shape of the opening 72a and the like, and it may be circular and triangular other than square as illustrated in the figures.

In the sound absorbing material 70 as a preferred embodiment of the present invention illustrated in the figures, the perforated metal sheets 72 and 74 differ in opening size. With such a structure, the aforementioned sound absorbing effects a–c can be exhibited satisfactorily to achieve better sound absorbing characteristics. In the present invention, the perforated metal sheets different in opening size are those having openings (for example 72a and 74a) different in area.

Figure 3:
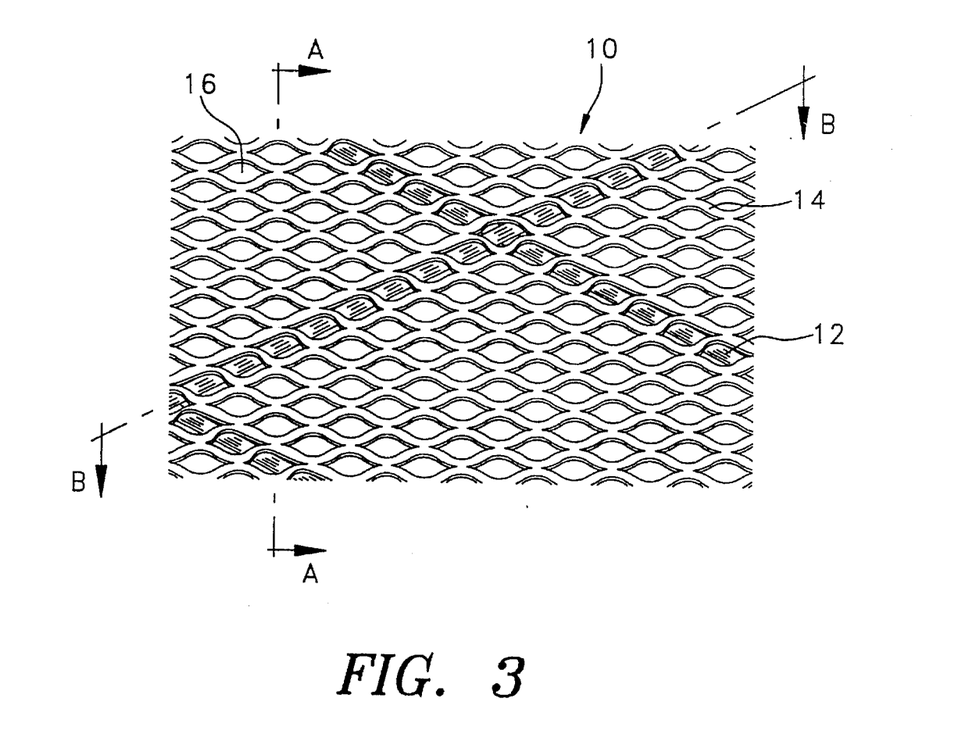
FIG. 3 is a schematic perspective view of another example of the membranous-vibration sound absorbing material of the present invention.

There is no particular limitation on the difference of openings between the perforated metal sheets in opening rate, area, distribution pattern, but the difference may be such that the openings 72a and 74a of the perforated metal sheets 72 and 74 are not substantially overlapped with each other and differ in location suitably as illustrated in FIG. 2(*a*) or FIG. 3.

The sound absorbing material of the present invention is in no way limited to one illustrated in the figures in which a resin thin film is sandwiched between perforated metal sheets different in opening size and may be one in which the resin thin film 16 is sandwiched between perforated metal sheets having the same opening size.

In this case, the resin thin film 16 is sandwiched between the perforated metal sheets in such a way that the openings of the perforated metal sheets sandwiching the resin thin film 16 are not overlapped with each other (openings are disposed in different locations or staggered), whereby the aforementioned sound absorbing effects a–c can be exhibited satisfactorily to achieve good sound absorbing characteristics.

The thickness of the perforated metal sheets used is not limited to any particular value, but perforated metal sheets 0.3–1 mm thick are preferably used when sound absorbing characteristics, handling ease, workability and productivity in an embodiment of the present invention in which the individual members are compressed and will be described hereinafter are taken into consideration.

For the same reasons, when an expanded metal sheet is used, an expanded metal sheet 0.4–5 mm thick, and when a metal screen is used, a metal screen having a wire diameter of 0.3–2 mm are preferably used.

In the sound absorbing material of the present invention, there is no particular limitation on the material of the sheet such as a perforated metal sheet, but sheets made of metals such as aluminum, iron and copper, alloys such as stainless steel, and resins can be used.

In particular, aluminum and its alloy sheets are preferably used because of good workability, weatherability, light-weight, mutual adhesion and adhesion to the resin thin film 16 in an embodiment of the present invention in which the sheets to be described hereinafter are compressed. From the viewpoints of sound absorbing characteristics and the like, iron and its alloy sheets are also preferably used.

The sound absorbing material 70 of the present invention has such a structure that the resin thin film 16 is held between such perforated metal sheets 74 and 72.

Because of the structure described above, the sound absorbing material 70 of the present invention has excellent strength, workability, and transparency and a dust-proof property when necessary by utilizing the membranous vibrations of the resin thin film. Furthermore, the sound absorbing material illustrated in the figures has a simple structure that the resin thin film is merely sandwiched between the perforated metal sheets 72 and 74.

The thin resin film to be used in the present invention is not limited in particular and may be selected from among any known resin thin films including thin films of vinyl chloride resins, polyethylene resins, polypropylene resins, fluoroethylene resins, polyvinylidene resins and acrylic resins. Among these, thin films of fluoroethylene resins and polyvinylidene resins are particularly advantageous from the viewpoints of good sound absorbing characteristics, weatherability and durability.

Any known types of fluoroethylene resins may be used in the present invention as the material for the thin film of polytetrafluoroethylene (PTFE), tetrafluoroethylene-hexafluoropropylene copolymer, ethylene-tetrafluoroethylene copolymer (ETFE) and polychlorotrifluoroethylene (PCTFE) may be listed as advantageous examples. These fluoroethylene resins are non-flammable and have high chemical, weather and heat resistances.

Any known types of polyvinylidene resins may be used in the present invention as the material for the thin film of polyvinylidene resins, and polyvinylidene difluoride (PVDF), and polyvinylidene cyanide may be listed as advantageous examples. These vinylidene-base resins have high chemical and weather resistances.

The thickness of such a resin thin film 16 is not limited to any particular value but in order to achieve effective membranous vibrations and realize satisfactory sound absorbing characteristics, the resin film has a thickness of ca. 4–50 μm, preferably ca. 6–10 μm.

The sound absorbing material 70 of the present invention has the structure described above that the resin thin film 16 is sandwiched between the perforated metal sheets having openings 18.

For this reason, a transparent resin thin film is selected as the resin thin film 16 to enable people to see scenery through the sound absorbing material 70, whereby it can be suitably used for applications in which the observation of the opposite side through sound absorbing materials is desired such as insulation walls on expressways and noise controlling absorbents for machines installed in factories and research facilities.

The resin thin film 16 used in the sound absorbing material 70 of the present invention is by no means limited to a transparent one, but may be opaque as a matter of course.

Moreover, the resin thin film 16 may be colored, and further the perforated metal sheets may be colored the same as the resin thin film 16.

The resin thin film 16 may have a continuous plane, that is, no ruptures at all, or may have ruptures formed. When the resin thin film 16 having a continuous plane, that is, no ruptures at all, is used, it can exhibit excellent sound absorbing characteristics due to the aforementioned sound absorbing effects a–c, whereas when the resin thin film 16 having ruptures is used, it can also exhibit excellent sound absorbing characteristics due to the aforementioned sound absorbing effects a and d.

For instance, when a thin film having no ruptures is used as the thin film 16 of the sound absorbing material 70 of the present invention, it can be suitably used for applications which strongly require dust-proof and dust-free properties such as clean rooms in LSI factories.

Along with recent technical advances, the need for clean rooms is growing from LSI and pharmaceutical factories and research facilities.

Since various types of manufacturing equipment, analyzers, measuring instruments and other sound sources are installed in clean rooms, it is necessary to prevent noise in such working environment. As conventional sound absorbing materials are made of porous materials, it is difficult to prevent the generation and entry of dust, and only a porous material cannot be used as a sound absorbing material for clean rooms.

Contrary to this, the sound absorbing material 70 of the present invention has no possibility of generating dust since it utilizes membranous vibrations of a resin thin film made of non-porous material.

Besides, the resin thin film 16 having no ruptures can prevent entry of dust from outside, and the sound absorbing material 70 of the present invention can be used in combination with a conventional sound absorbing material made of porous material (on the side opposite to sound sources) while it ensures dust-proof and dust-free properties, thereby achieving better sound absorbing characteristics. A membranous-vibration sound absorbing material (according to another embodiment of the present invention) which includes this porous material will be described in detail hereinafter.

Therefore, the sound absorbing material 70 of the present invention, particularly the sound absorbing material 70 having no ruptures in the resin thin film 16, is extremely useful as a sound absorbing material for applications that require high dust-proof and dust-free properties such as clean rooms.

Meanwhile, excellent sound absorbing characteristics can be obtained by making ruptures such as slots in the resin thin film 16.

As described in the foregoing, the sound absorbing material 70 of the present invention is one which utilizes the membranous vibrations of the resin thin film 16, and excellent sound absorbing characteristics (aforementioned sound absorbing effect d) can be obtained by making ruptures in the resin thin film 16 to create the membranous vibrations of the ruptured portions together with the resin thin film 16 in the process of sound absorption. In addition, the formation of ruptures does not impair transparency.

Therefore, the sound absorbing material having ruptures in the resin thin film 16 can be suitably used for applications requiring both transparency and sound absorbing characteristics such as expressways and factories.

When ruptures are formed in the resin thin film 16, the ruptures are by no means limited and may be formed in a regular pattern or an irregular pattern in areas that correspond to the openings of the perforated metal sheet 74 having larger openings and the openings of the perforated metal sheet 72 having smaller openings. There is also no limitation on the number of ruptures. The size and shape of the ruptures may be set to arbitrary ones that do not impair the strength of the resin thin film 16.

There is no particular limitation on the method for producing the sound absorbing material 70 of the present invention. For instance, a laminate consisting of the perforated metal sheets 72 and 74 and the resin thin film 16 may be first formed, and the periphery or an optional portion of the laminate may be fixed by various members and adhesive, or the periphery may be held by a frame or the like.

Figure 4:
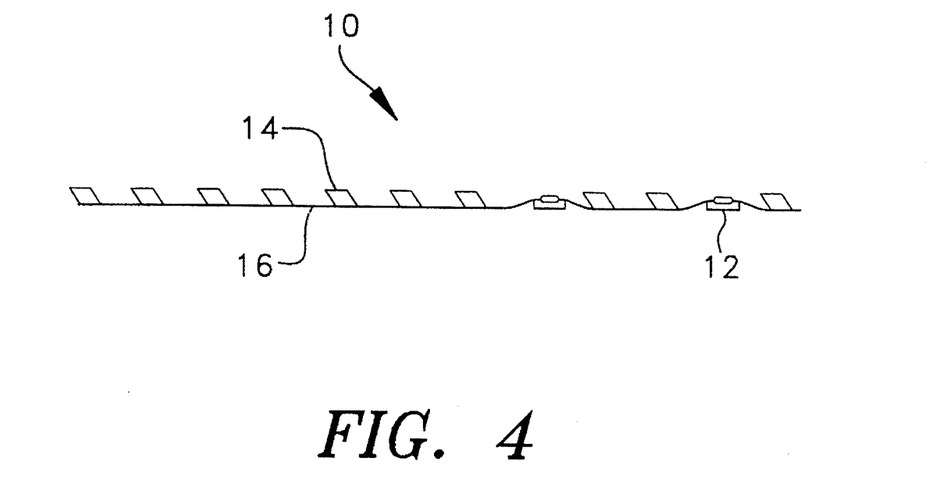
FIG. 4 is a schematic sectional view taken on line A—A of the sound absorbing material shown in FIG. 3.
Figure 5:
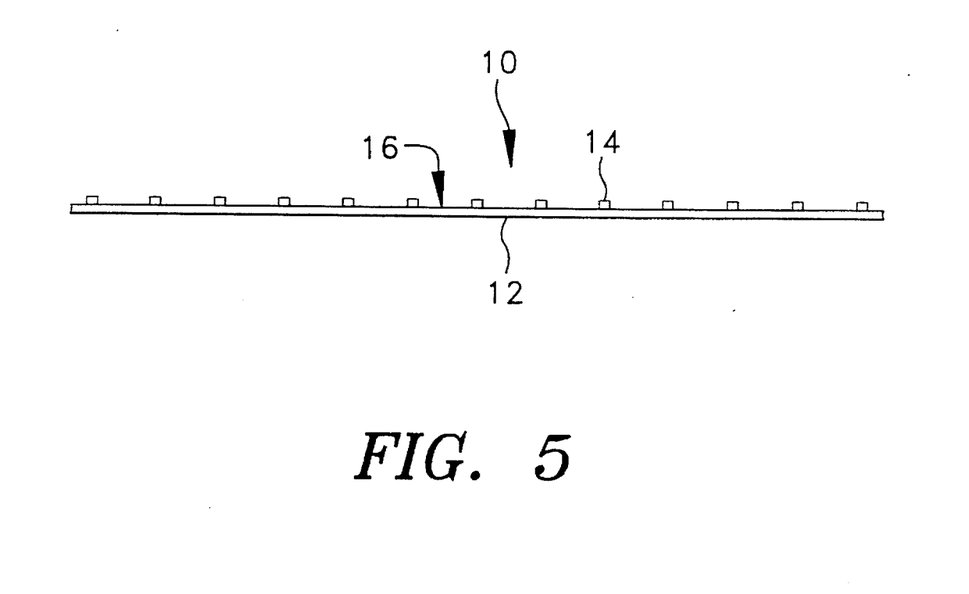
FIG. 5 is a schematic sectional view taken on line B—B of the sound absorbing material shown in FIG. 3.

FIG. 3 is a schematic plan view of another example of the sound absorbing material of the present invention, and FIG. 4 is a schematic sectional view taken on on line A—A and FIG. 5 is a schematic sectional view taken on line B—B.

The sound absorbing material 10 illustrated in these figures has such a structure that the resin thin film 16 is sandwiched between the expanded metal sheet 12 having larger openings and the expanded metal sheet 14 having smaller openings, and the expanded metal sheet 12, the resin thin film 16 and the expanded metal sheet 14 are pressed together.

Figure 6:
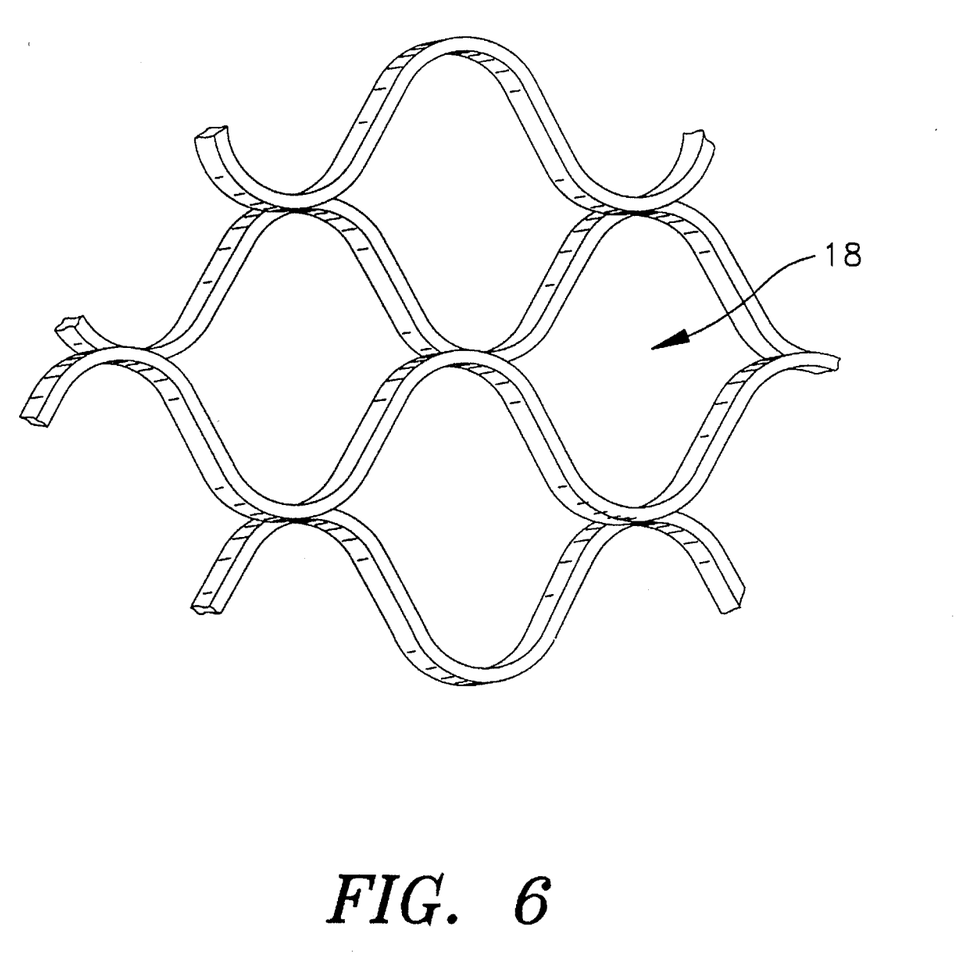
FIG. 6 is a schematic perspective view of the expanded metal sheet.

An expanded metal sheet is a sheet manufactured by the process of making slots in the metal sheet and stretching in a direction generally perpendicular to the slots to make a network with openings 18 as basically shown in FIG. 6.

As the slotted sheet is stretched by tensile strength, the expanded metal sheet experiences torsion not only in a direction perpendicular to the plane surface but also in parallel and oblique directions, so good adhesion can be achieved by intertwining with the resin thin film 16 and the expanded metal sheets in the sound absorbing material in which the resin thin film 16 and two expanded metal sheets sandwiching the film 16 are pressed into a laminate.

The size of openings 18 in the expanded metal sheets differs with the degree of working such as slotting and stretching.

The degree of working on the expanded metal sheet to be used in the present invention is not limited in any particular way and may be determined as appropriate in accordance with such factors as the adhesion to other members and the desired sound-absorbing characteristics.

In the sound absorbing material in which individual members are pressed, an expanded metal sheet having larger openings normally as thick as 1–5 mm is suitably used, whereas an expanded metal sheet having smaller openings normally as thick as 0.4–1.5 mm is suitably used. When a metal screen is used as a sheet, a metal screen having larger openings with a wire diameter of 1–2 mm is suitably used, whereas a metal screen having smaller openings with a wire diameter of 0.3–1 mm is suitably used.

In the sound absorbing material 10 illustrated in the figures in which individual members are pressed, higher sound absorption coefficients can be obtained by two expanded metal sheets 12 and 14 for sandwiching the resin thin film 16 which have openings different in size.

In particular, excellent sound absorbing characteristics can be achieved by the expanded metal sheet 12 having larger openings 18 large in size since the resin thin film 16 can vibrate satisfactorily with sound waves.

In the sound absorbing material 10, the difference of opening size between the expanded metal sheet 12 and the expanded metal sheet 14 is not limited to any particular value and may be selected as appropriate in accordance with the application of the sound absorbing material 10. From the viewpoints of sound absorbing characteristics, transparency to be described hereinafter, and the prevention of damage on the resin thin film 16, the opening 18 of the expanded metal sheet 12 is normally 1 to 50 times larger than the opening 18 of the expanded metal sheet 14. The size of the opening of the expanded metal sheet may be selected in consideration of sound frequencies to be absorbed.

The sound absorbing material 10 of the present invention having such a structure that the resin thin film 16 is held between the expanded metal sheets by press can be manufactured by various methods for producing laminates. The preferred method comprises the steps of first preparing a laminate having the resin thin film 16 held between the expanded metal sheet 12 and the expanded metal sheet 14 and then pressing the laminate in a continuous manner by means of rollers so that the individual members are pressed together into a laminated sheet as shown in FIG. 4 (FIG. 5).

Stated more specifically, this method starts with sandwiching the resin thin film 16 between the expanded metal sheet 12 and the expanded metal sheet 14 to prepare a laminate and then the laminate is continuously pressed by means of rollers to compress the individual members together into a laminated sheet.

By adopting this compression technique, the expanded metal sheet 14 having smaller openings bites into the expanded metal sheet 12 having larger openings and the respective members of the laminate adhere to each other sufficiently strongly due to the ductility of metal as shown in FIG. 5 of a cross section along the expanded metal sheet 12 so that the resulting laminated sheet can be cut to a suitable shape or worked to a desired shape after production.

Particularly, using aluminum-base expanded metal sheets made of aluminum or aluminum-base alloys, more preferably using aluminum-base expanded metal sheets subjected to annealing treatment, strong adhesion among the respective individual members can be obtained. In particular, in the method which uses a pressure compression technique, a sound absorbing material having excellent strength and workability can be realized.

There is no particular limitation on the pressure used to compress the individual members of the laminate to produce the sound absorbing material 10. However, in order to insure that the respective members adhere strongly to each other, the laminate is preferably compressed at pressures of ca. 300–2,000 kg/cm$^2$. The laminate may be compressed partly and not entirely, and various adhesive may optionally be used as auxiliary means.

Further, in order to make sure that ruptures will be formed in the resin thin film 16, slots or other cuts may be preliminarily formed in the resin thin film 16 at desired positions.

There is no particular limitation on the use of the sound absorbing material of the present invention, but in order to insure that the resin thin film 16 vibrates satisfactorily with sound waves, it is preferred that a sheet having a smaller opening size, that is, a sheet having smaller openings, is directed toward the side of sound sources.

The sound absorbing material according to another embodiment of the present invention is an assembly of the sound absorbing material 70 or 10, that is, a laminate consisting of a resin thin film having a continuous plane or ruptures and sheets such as perforated metal sheets and expanded metal sheets, preferably sheets having openings different in size, with a conventional known porous sound absorbing material such as glass fiber and rock wool.

Because of the structure described above, a sound absorbing material having excellent sound absorbing characteristics and both characteristics of the absorbing material of the present invention and a porous material can be realized.

EXAMPLES

The following examples are provided for the purpose of further illustrating the present invention but are by no means to be taken as limiting. The (membranous vibration) sound absorbing material of the present invention will be described in detail.

Example 1

A sound absorbing material according to an embodiment of the present invention shown in FIG. 2 (simply sandwiching a resin thin film between sheets) was prepared by sandwiching a transparent PTFE thin film 9 μm thick and having no ruptures between a square perforated metal sheet (opening rate: 56%) having 12×12 mm openings and a square perforated metal sheet (opening rate: 64%) having 10×10 mm openings.

The absorption coefficient of the thus obtained sound absorbing material was measured by a normal-incidence sound absorption method for construction materials (JIS 1405-1963) with an air layer (80 mm) provided at the back of the material. The square perforated metal sheet having 10×10 mm openings of this sound absorbing material was located on the side of sound sources. The results are shown in FIG. 7.

Figure 7:
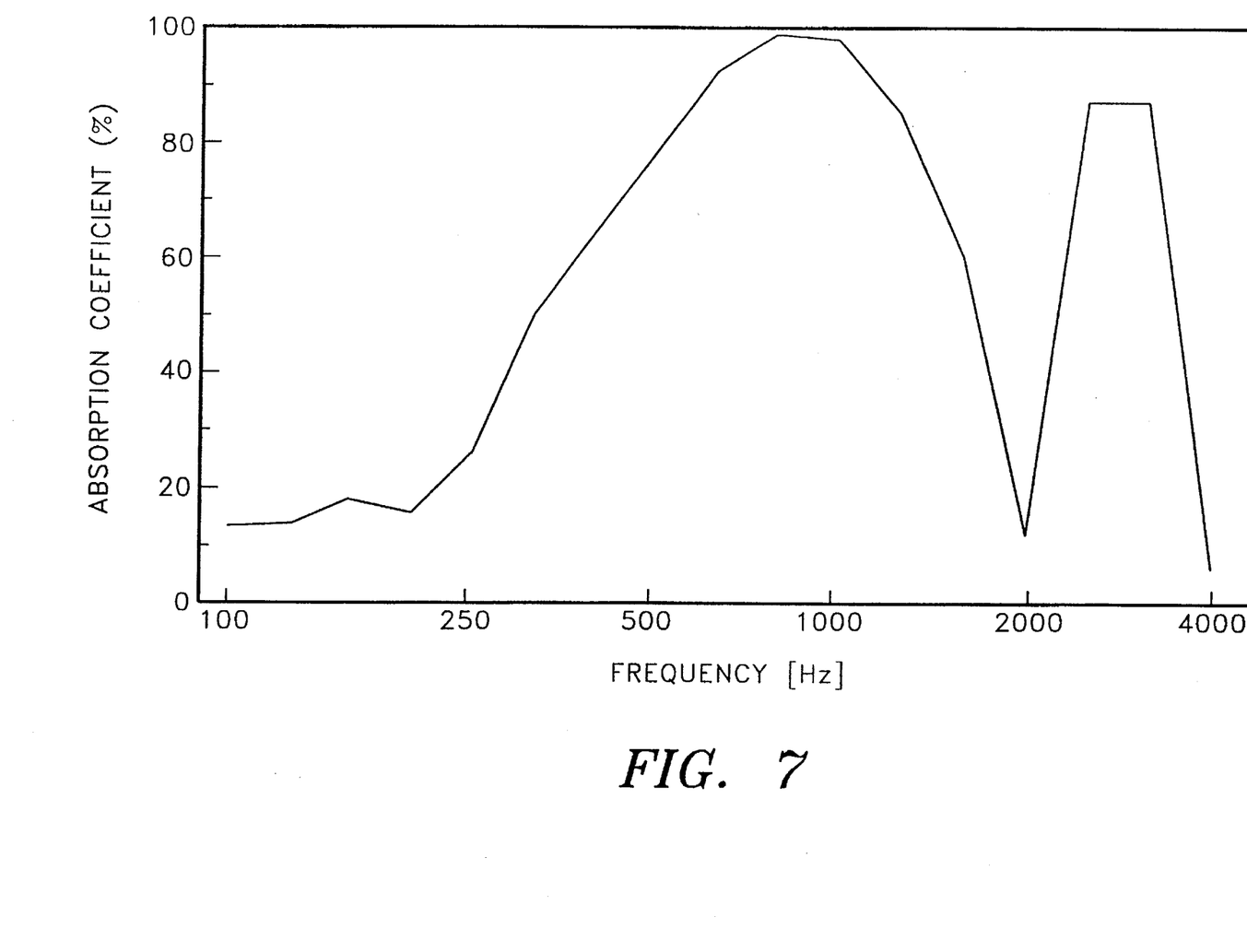
FIG. 7 is a graph showing the sound-absorbing characteristics of an example of the membranous-vibration sound absorbing material of the present invention.

It is clear from FIG. 7 that the sound absorbing material in accordance with the present invention exhibited good sound-absorbing characteristics over a broad frequency range.

Example 2

A sound absorbing material according an embodiment of the present invention in which a resin thin film is sandwiched between sheets as shown in FIG. 2 was prepared by sandwiching a transparent PTFE thin film 6 μm thick and having no ruptures between flat sheets obtained by rolling a square perforated metal sheet having 12×12 mm openings (opening rate: 56%) and a 1 mm thick aluminum expanded metal sheets (5 mm across the shorter side of the opening; 10 mm across the longer side of opening).

The absorption coefficient of the thus obtained sound absorbing material was measured by a normal-incidence sound absorption method for construction materials (JIS 1405-1963) with an air layer (50, 60 and 80 mm) provided at the back of the material. The square perforated metal sheet of this sound absorbing material was located on the side of sound sources.

Figure 8:
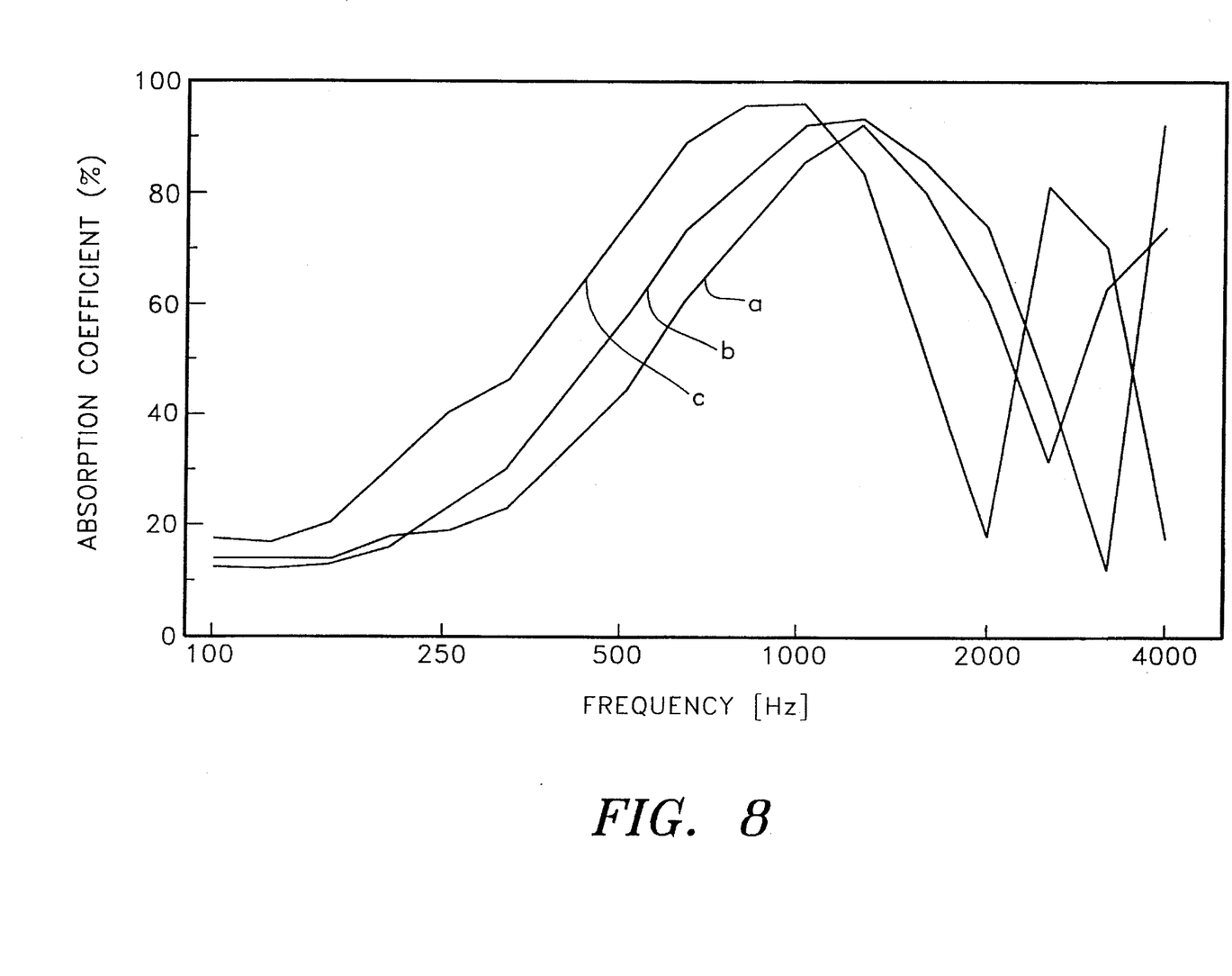
FIG. 8 is a graph showing the sound-absorbing characteristics of another example of the membranous-vibration sound absorbing material of the present invention.

The results are shown in FIG. 8.

It is clear from FIG. 8 that the sound absorbing material in accordance with the present invention exhibited good sound absorbing characteristics over a broad frequency range. In FIG. 8, "a", "b" and "c" show the results for 50 mm, 60 mm and 80 mm air layers, respectively.

Example 3

The following members were prepared for the construction of a sound absorbing material according to present invention in which the individual members are compressed as shown in FIG. 3.

a. Al base expanded metal sheet S 1 mm thick (the size of opening: 5 mm across the shorter side of the opening; 10 mm across the longer side of the opening)

b. Al base expanded metal sheet L 2 mm thick (the size of opening: 36 mm across the shorter side; 76 mm across the longer side)

c. transparent PTFE thin film c 10 μm thick and having no ruptures d. transparent PTFE thin film d 10 μm thick and having ruptures The above members were used to prepare a laminate having the PTFE thin film held between the aluminum base expanded metal sheets and the laminate was compressed at a pressure of 800 kg/cm$^2$ to construct various samples of (membranous-vibration) absorbing material shown below and illustrated in FIG. 3.

The materials used (constructed laminates) are shown in Table 1 below.

The thus constructed sound absorbing materials were combined with an 80 mm air layer or a 80 mm glass fiber layer (referred to as "GF layer" hereinafter) having a surface density of 32 kg/m$^3$, and the absorption coefficients of the thus obtained assemblies were measured by a reverberation method for construction materials (JIS A1409-1967). The expanded metal sheet S having small openings of the thus constructed sound absorbing materials was located on the side of sound sources. The measurement results of absorption coefficients are shown in FIG. 9.

The presence and absence of the air layer and glass fiber layer are represented by the marks o and x, respectively, in Table 1.

Figure 9:
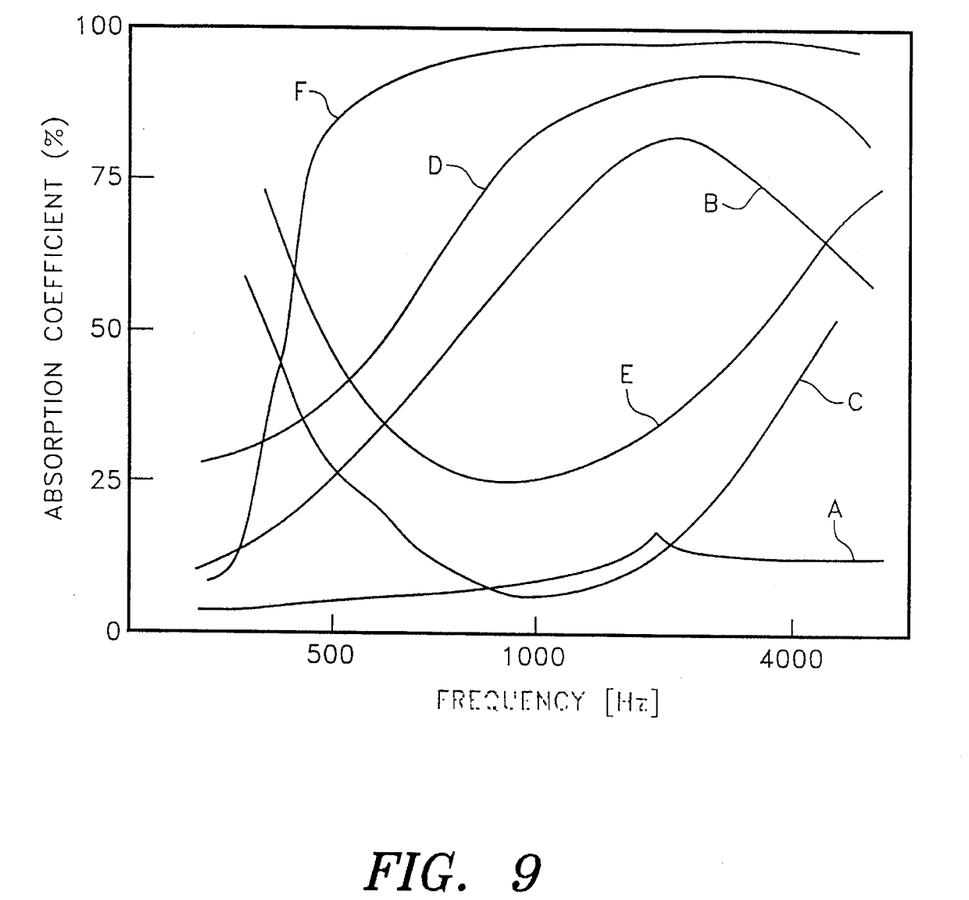
FIG. 9 is a graph showing the sound-absorbing characteristics of another example of the membranous-vibration sound absorbing material of the present invention.

As shown in FIG. 9, the sound absorbing materials C and D having the thin film c having no ruptures and the thin film d having ruptures sandwiched between expanded metal sheets different in opening size exhibited better sound-absorbing characteristics than the sound absorbing materials A and B having the same thin films sandwiched between expanded metal sheets having the same opening size, respectively.

The sound absorbing materials E and F using the GF layer in place of the air layer provided at the back of the sound absorbing materials C and D exhibited better sound-absorbing characteristics than these sound absorbing materials C and D, respectively.

TABLE 1

| Sample | Materials | Air Layer | GF Layer |
|---|---|---|---|
| A | thin film c sandwiched between two expanded metal sheets S | o | x |
| B | thin film d sandwiched between two expanded metal sheets S | o | x |
| C | thin film c sandwiched between expanded metal sheet S and expanded metal sheet L | o | x |
| D | thin film d sandwiched between between expanded metal sheet S and expanded metal sheet L | o | x |
| E | thin film c sandwiched between expanded metal sheet S and expanded metal sheet L | x | o |
| F | thin film d sandwiched between expanded metal sheet S and expanded metal sheet L | x | o |

Example 4

A membranous-vibration sound absorbing material according to the present invention was constructed making use of expanded metal sheets having a larger opening size (50 mm across the shorter side of the opening; 100 mm across the longer side of the opening) in place of the expanded metal sheet L of the item b described in the foregoing. The same measurement was conducted on the membranous-vibration sound absorbing material.

As a result, better sound absorbing characteristics than those shown in FIG. 9 could be obtained.

The effects of the present invention are obvious from the above results.

As described on the foregoing pages, the sound absorbing materials of the present invention can achieve not only good sound-absorbing characteristics, workability and strength, but also transparency. Furthermore, the sound absorbing materials can achieve a dust-proof property when necessary for application in clean rooms and the like. Therefore, they can be suitably used for various applications.

What is claimed is:

1. An improved membranous-vibration sound absorbing material which comprises two perforated sheets having perforations of different sizes, for providing a sound absorbing effect, and a thin plastic film having a continuous non-perforated surface, wherein the thin plastic film is sandwiched between the two perforated sheets with a portion of the thin plastic film non-rigidly affixed between the two perforated sheets, to control the tension of the thin plastic film so that the thin plastic film vibrates upon the impact of sound waves and so that the vibrations of the thin plastic film combine with the sound absorbing effect of the two perforated sheets.

2. The improved membranous-vibration sound absorbing material of claim 1, wherein the film is transparent or opaque.

3. The improved membranous-vibration sound absorbing material of claim 1, wherein the film has a thickness of about 4 to about 50 μm.

4. An improved membranous-vibration sound absorbing material which comprises two perforated metal sheets, and a thin resin film forming a continuous plane, wherein the thin resin film is sandwiched between the two perforated metal sheets so that the film vibrates between the two perforated metal sheets in response to and with sound waves to absorb vibrations and sound waves.

5. The membranous-vibration sound absorbing material according to claim 4, wherein the sheets which sandwich film have openings of different sizes.

6. The membranous-vibration sound absorbing material according to claim 4, wherein the film is transparent.

7. The improved membranous-vibration sound absorbing material of claim 4 herein said metal sheets have perforations of different sizes.

8. The improved membranous-vibration sound absorbing material of claim 4 wherein said metal sheets are selected from the group consisting of an expanded metal sheet and a metal screen.

9. The improved membranous-vibration sound absorbing material of claim 4 wherein said film is transparent or opaque.

10. The improved membranous-vibration sound absorbing material of claim 4 herein the film has a thickness of about 4 to about 50 μm.

11. The improved membranous-vibration sound absorbing material of claim 7 wherein the perforations are disposed in different locations in the sheets.

12. The improved membranous-vibration sound absorbing material of claim 4 wherein the metal sheets have a thickness of about 0.4 to about 5 mm.

13. The improved membranous-vibration sound absorbing material of claim 4 wherein the film is a resin selected from the group consisting of vinyl chloride, polyethylene, polypropylene, fluoroethylene, polyvinylidine and acrylic.

14. The improved membranous-vibration sound absorbing material of claim 13 wherein the resin is fluoroethylene or polyvinylidine.

* * * * *